E. T. SILVIUS.
CREDIT ACCOUNTING REGISTER.
APPLICATION FILED MAR. 4, 1911.
1,168,754.
Patented Jan. 18, 1916.
4 SHEETS—SHEET 1.
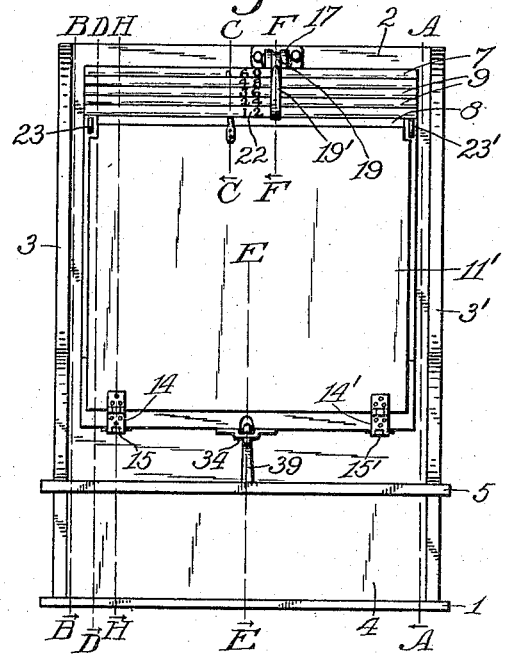
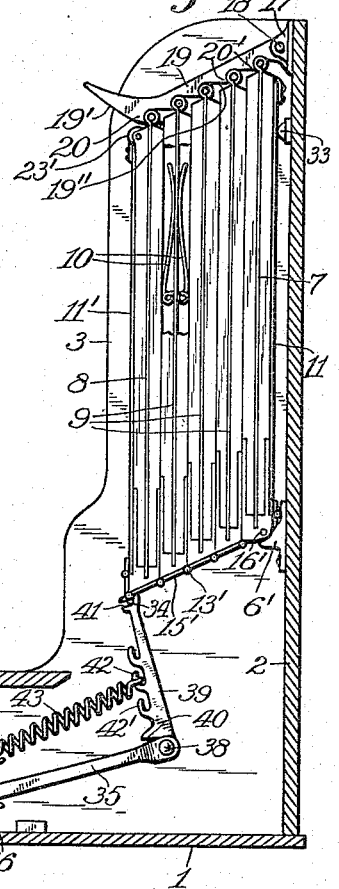
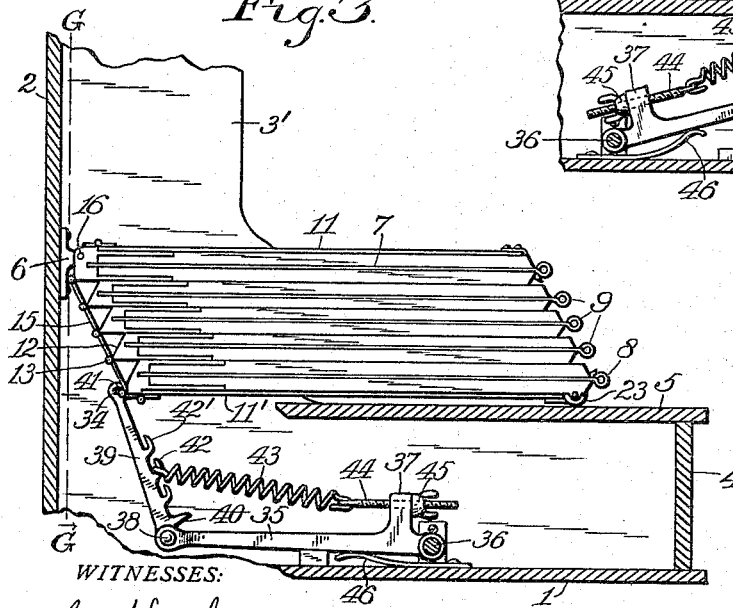
WITNESSES:
J. H. Gardner
K. R. Woddell
INVENTOR:
Ellis T. Silvius
THE COLUMBIA PLANOGRAPH CO., WASHINGTON, D. C.

E. T. SILVIUS.
CREDIT ACCOUNTING REGISTER.
APPLICATION FILED MAR. 4, 1911.

1,168,754.

Patented Jan. 18, 1916.
4 SHEETS—SHEET 2.

WITNESSES:
J. H. Gardner
K. R. Woddell

INVENTOR:
Ellis T. Silvius

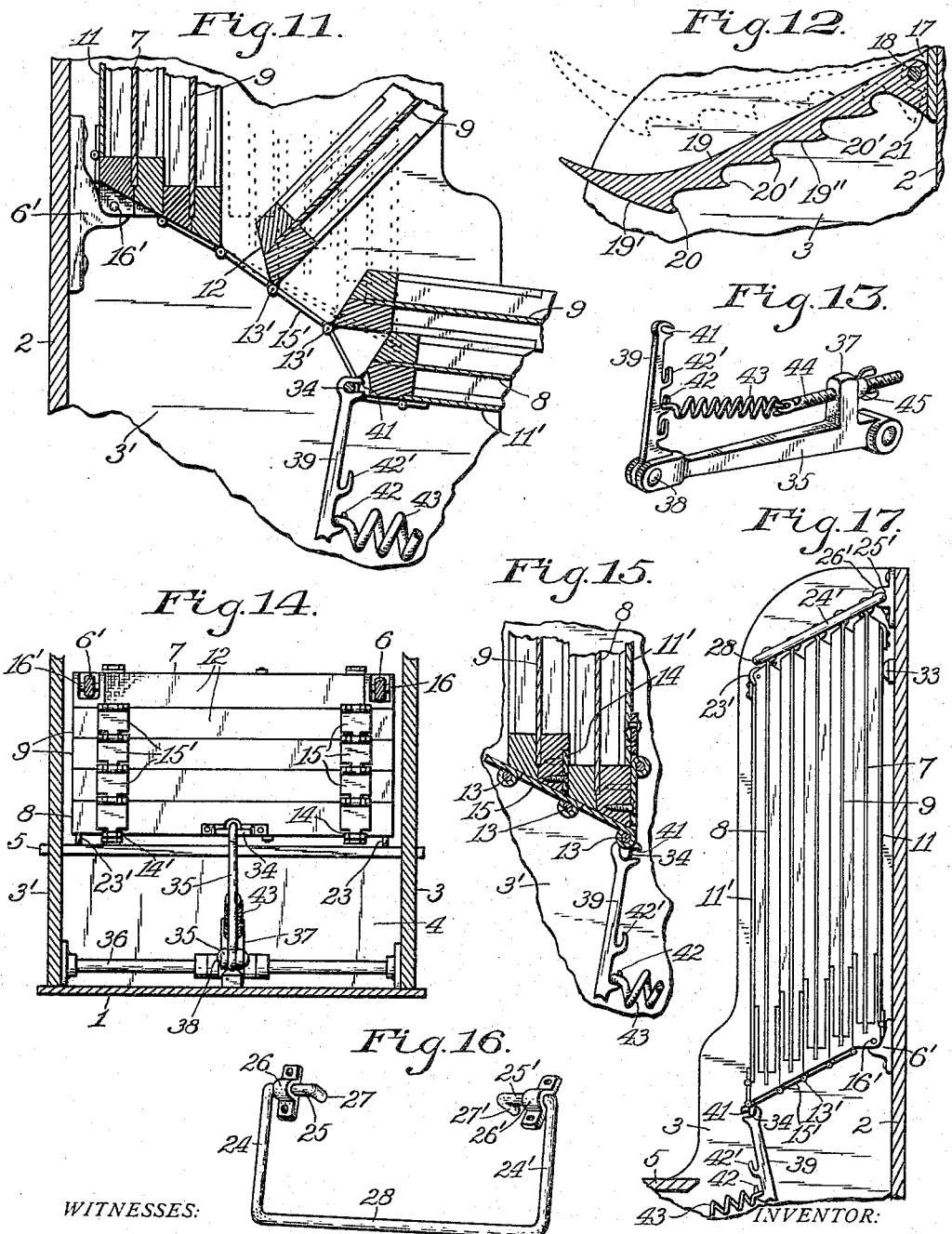

E. T. SILVIUS.
CREDIT ACCOUNTING REGISTER.
APPLICATION FILED MAR. 4, 1911.
1,168,754.
Patented Jan. 18, 1916.
4 SHEETS—SHEET 4.
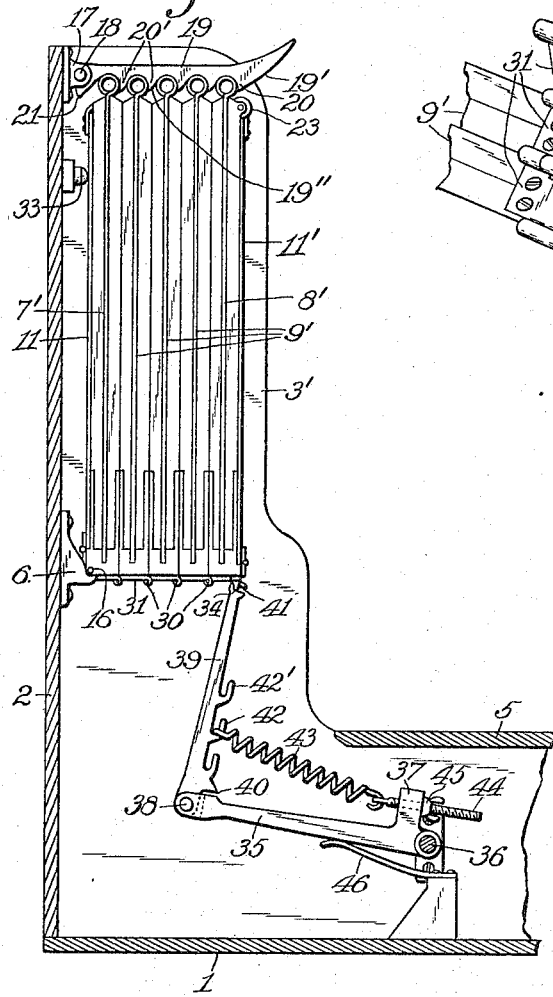
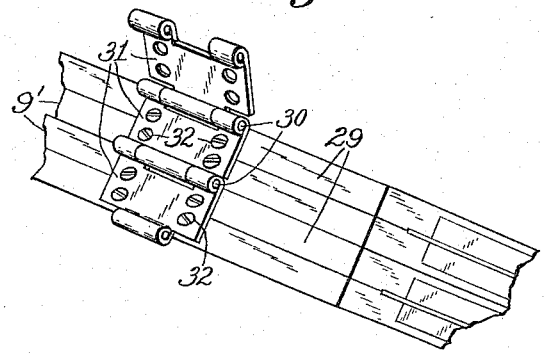
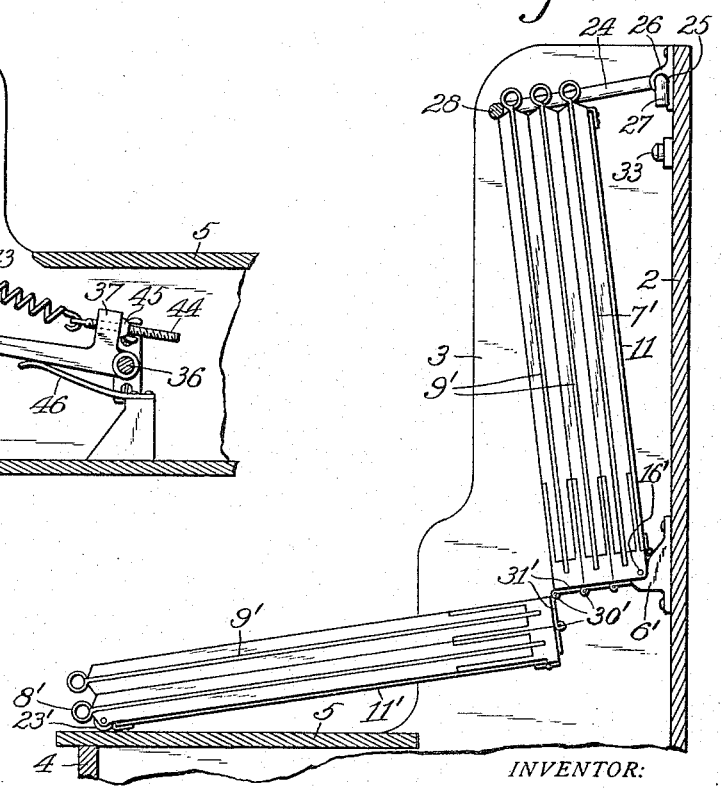
WITNESSES:
J. H. Gardner
K. R. Woddell
INVENTOR:
Ellis T. Silvius

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

CREDIT-ACCOUNTING REGISTER.

1,168,754. Specification of Letters Patent. Patented Jan. 18, 1916.

Application filed March 4, 1911. Serial No. 612,269.

*To all whom it may concern:*

Be it known that I, ELLIS T. SILVIUS, a citizen of the United States, residing at Indianapolis, in the county of Marion and State of Indiana, have invented a new and useful Credit-Accounting Register, of which the following is a specification, reference being had to the accompanying drawings, and to the letters and figures of reference marked thereon.

This invention relates to filing appliances for systematically preserving commercial or other papers of various kinds, more especially bill-slips or duplicate invoices commonly used in credit accounting systems, the invention having reference particularly to the class of filing appliances known as credit accounting registers which comprise essentially a plurality of bill-holding leaves hingedly connected together and normally supported in substantially upright position, and movable forward to prone position for gaining access to the accounts represented by the bill slips.

The principal object of the invention is to provide improved means for connecting the leaves together and supporting them in normal position in a case which with the leaves constitute a filing cabinet; a specific object being to provide simple and cheap clasping means adapted to be used in connection with bill-holding leaves that are simply and cheaply connected together at the lower ends, for holding the upper ends together in the case and preventing the leaves from falling forward, a further object being to provide improved means for assisting the leaves to rise to normal position after having been moved to prone position; and a still further object is to provide an improved holder for the group of leaves when removed from the case.

The invention comprises certain novel features of construction in filing appliances of the above-mentioned character, and in the parts and combinations and arrangements of parts, as hereinafter particularly described and claimed.

Figure 4:
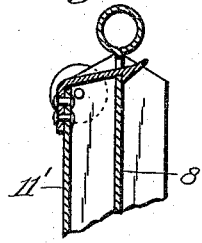
Figure 5:
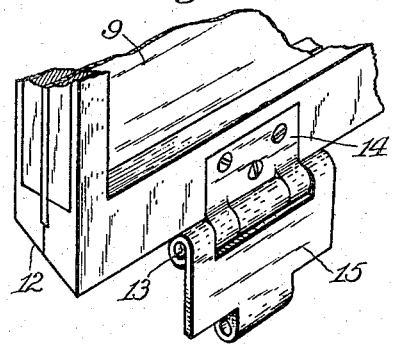
Figure 6:
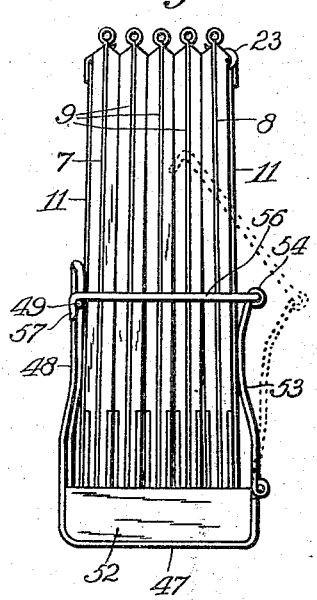
Figure 7:
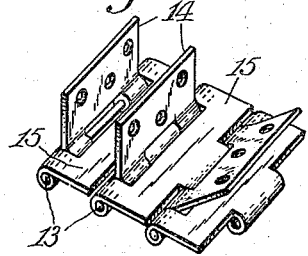
Figure 8:
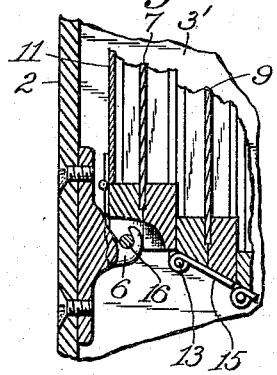
Figures 9, 10:
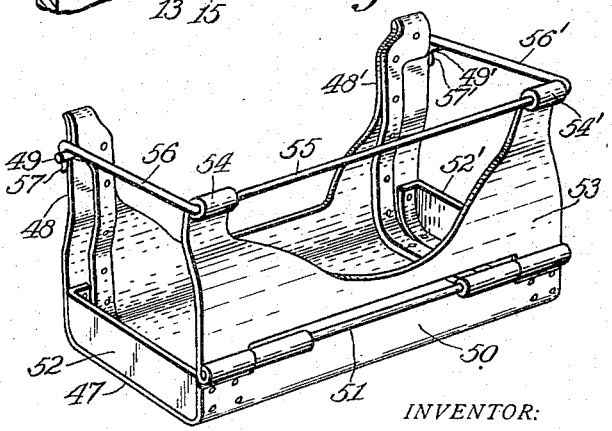

Referring to the drawings, Figure 1 is a front elevation of the credit accounting register constructed substantially in accordance with the invention; Fig. 2, a vertical section partially broken away on the plane of the line A A in Fig. 1; Fig. 3, a fragmentary section approximately on the plane of the line B B in Fig. 1 with the leaves arranged in prone position; Fig. 4, a fragmentary section on the line C C in Fig. 1; Fig. 5, a fragmentary perspective view of one of the bill-holding leaves; Fig. 6, a side elevation of the improved holder supporting the group of leaves removed from the case; Fig. 7, a perspective view of hinging connections suitable for connecting the leaves together; Fig. 8, a fragmentary section on the line D D in Fig. 1; Fig. 9, a fragmentary sectional elevation showing leaves in the holder; Fig. 10, a perspective view of the holder for the leaves; Fig. 11, a fragmentary section on the plane of the line E E in Fig. 1 with the leaves in different positions; Fig. 12, a fragmentary section on the line F F in Fig. 1; Fig. 13, a perspective view of the improved apparatus preferably employed for balancing the leaves; Fig. 14, a fragmentary section on the plane of the line G G in Fig. 3; Fig. 15, a fragmentary section on the line H H in Fig. 1; Fig. 16, a perspective view of a modified form of clasp for the leaves; Fig. 17, a fragmentary section as at the plane of the line A A in Fig. 1 with the modified form of clasp arranged in the case; Fig. 18, a fragmentary section as at the plane of the line B B in Fig. 1, but showing the leaves connected together in non-stepped arrangement or as a rectangular pack and arranged in connection with the preferred form of clasp; Fig. 19, a fragmentary perspective view showing the hinging connections of the leaves illustrated in the preceding figure; and Fig. 20, a fragmentary section as at the plane of the line A A in Fig. 1, but with the case provided with the modified form of clasp and illustrating the manner of holding up the leaves when connected together as a rectangular pack and supported by means of the rearmost one of the leaves.

Similar reference characters in the different figures of the drawings indicate corresponding elements or features of construction herein referred to and described.

In the construction of credit accounting registers or filing cabinets, a suitable case is provided which may be variously constructed and may suitably comprise a bottom 1, a relatively high back 2, sides 3 and 3' of which the forward portions are relatively low to constitute desk portions, and the rear portions are approximately as high as the back; a suitable front 4, and a top 5 on the front and the tops of the forward portions of the sides. The back 2 is provided with a plurality of pivot supports 6 and 6' for pivotally supporting the rearmost one of the leaves, there being a suitable number of leaves comprising a rear leaf 7, a front leaf 8 and intermediate leaves 9 which may be variously constructed in detail and provided with suitable means for retaining bill slips thereon, such as bill clamps 10, the leaves preferably being of frame-like form adapted to be arranged close together, but in the present case, as preferably connected together may be forced slightly apart when holding excessively large quantities of the bill slips. In some cases the rear leaf and the front leaf may be provided with doors 11 and 11', respectively, for various uses as heretofore. In some cases each leaf has an oblique angled lower end 12 conforming to the angle in which the leaves are stepped in normal position, and the lower forward portion of each leaf, which is acute angled, is provided with a pair of hinge-pins 13 and 13' preferably connected thereto by means of hinge-plates 14 and 14' secured to the leaf and carrying the hinge-pin, a hinge-plate 15 or 15' being connected at opposite ends thereof to the hinge-pins of two adjacent leaves and normally extending against the oblique angled end 12 of the leaf. The lower rear portion of the rear leaf 7 is provided with pivots 16 and 16' which are normally supported on the pivot supports 6 and 6', respectively. As preferably constructed, the middle portions of the leaves extend upward beyond the upper ends of the frame-like portions of the leaves which are broader than the middle portions, so that there are spaces between the ends of the middle portions, as is clearly illustrated in accordance with common practice. It should be understood that the rear leaf supported in the case supports the weight of the forward leaves, all being hingedly connected together and preferably in echelon as illustrated in Figs. 1, 2, 8, 11, 15 and 17 particularly, but may be otherwise connected together, as will be hereinafter described. In order to prevent the leaves from falling forward from their normal position, a suitable bracket 17 is mounted on the back 2 and provided with a hinge-pin 18 to which is connected a clasp comprising an arm 19 which extends forwardly and has its forward end turned upwardly so as to constitute an oblique angled guide 19' facing downwardly and forwardly to be engaged by the upper ends of the leaves when swung to normal position, for raising the arm, the under side of which has a plurality of hook-like projections or fingers 20, 20', one for each leaf, the arm having oblique angled guides 19 extending from the base of one projection rearward to the extremity of the next rearward adjacent projection, so that the upper end of either leaf when moved upward toward normal position may push the arm upward until a projection or all of them may engage the forward sides of the upper ends of the leaves and prevent them from accidentally falling forward by the force of gravity. The clasp falls by force of gravity and is limited in its downward movement by means of a heel 21 extending downward from the pivotal connection thereof against the base of the bracket 17. The upper forward sides of the leaves are provided with indexing characters 22 as usual, and the upper forward side of the front leaf 8 preferably is provided with rollers 23 and 23' to roll on the top 5 when the leaf is in prone position and moved in operation, but in some cases the rollers may be dispensed with if desired. In some cases the clasp may be constructed as in Figs. 16, 17 and 20, if desired, and it comprises two arms 24 and 24' on one end of each of which is a journal 25 or 25' alining each with the other and provided with journal boxes 26, 26', secured to the back 2, the inner ends of the journals being provided with lateral projections 27 and 27' adapted to engage the back 2 when the leaves are all in prone position to limit the downward movement of the arms, a rod 28 being integrally connected to the free ends of the arms and adapted to engage the upper forward portion of either one of the leaves when in approximately upright position or leaning forward slightly.

In some cases, as in the more inexpensive construction of filing cabinets, the leaves 7', 8', 9', have squared or right angled lower ends 29 provided at both forward and rear sides with hinge-pins 30, 30', preferably connected thereto by a hinge-plate 31 supporting two hinge-pins and each hinge-plate secured to the leaf by means of securing devices 32, and each hinge-plate is connected to a hinge-plate of an adjacent leaf so that the leaves are pivotally connected together at the planes of their adjacent sides, and it will be understood that the hinge pins may be variously connected to the leaves. Preferably the back 2 is provided with a buffer 33 against which the rear leaf stands in normal position.

From the foregoing it will be clear that when the leaves are in prone position they must be lifted by hand to their normally upright position and then latched to retain them in place or substantially in the desired position, and in some cases it may be desirable to mechanically assist the operator to lift the leaves from prone position and assist the clasp to hold them up in normal position, or to mechanically lift the leaves automatically from prone position when not held down, and hold them up in normal position independently of the clasp, in which case the lower forward portion of the front leaf 8 is provided with a pivot 34, and an articulated arm is provided which preferably comprises a main member 35 mounted on a pivot 36 which is suitably supported horizontally in the case, the member having a lug 37 on the upper side thereof near its pivoted end and is provided at its free end with a pivot 38 to which a fore-arm 39 is connected at one end thereof and extending upwardly and provided in the forward side of its free end with a recess 41 adapted to pivotally receive the pivot 34, for normally forcing the lower end of the front leaf in the forward direction. The forward side of the fore-arm has a hook 42 thereon and preferably other hooks 42' to one of which one end of a coil spring 43 is connected, the opposite end of the spring being connected to an adjusting screw 44 that extends movably through the lug 37 and is provided with an adjusting nut 45 normally seated against the forward side of the lug, for varying the tension of the spring. In some cases a spring 46 preferably is supported in a suitable manner in the case and engages the under side of the member 35, being adapted to normally support the weight of the swinging end of the articulated arm, but may be of any desired strength so as to force the forward leaves upward with any desired degree of force, the spring 43 acting to draw the free end of the fore-arm 39 forward and consequently tend to force the lower ends of the leaves forward and also to force the forward sides of the leaves upward, since each leaf is pivotally supported at its rear side, and therefore the upper ends of the leaves are normally forced rearward toward the back 2, so that the leaves may thus be held in normal position without entailing the expense of the clasp.

In order to provide a smooth base for the leaves when removed from the case so that they may slide freely into or out of a fire proof safe, and in order to hold the free ends of the leaves together a suitable holder is desirable which preferably comprises a base-plate 47 from which extends two upright supports 48 and 48' provided with lugs 49 and 49', respectively, the base plate having also a relatively low side part 50 provided with a hinge-rod 51, there preferably being ends 52 and 52' on the base plate, and a shutter 53 is connected to the hinge-rod and has two eyes 54 and 54' in which a rod 55 is rotatively supported and provided with arms 56 and 56' on its ends, the free ends of the arms having hooks 57 and 57' thereon to engage the lugs 49 and 49', so that the group of leaves may be placed upon the base-plate and secured between the supports 48 and 48' and the shutter 53 and readily carried about without liability of the leaves moving apart at their free ends.

In practical use, the group of leaves or holders for papers having been placed removably in the case so that the rearmost one of the leaves or holders is pivotally supported in the case, the clasp if employed is placed in connection with the upper end of the front leaf, so as to prevent the leaves from falling forward by the force of gravity, and if the hook type of clasp is employed all the leaves are held thereby individually, so that when a number of the forward leaves are moved to prone position the remaining leaves may be all held exactly at their normal position, as will be apparent; or if the several leaves remaining upright are not held back while being clasped they may move forward slightly at their tops and still be caught by the hook-like projections of the arm and will then be retained in leaning position somewhat as shown in Fig. 20. In case the modified form of clasp is employed it will be understood that all the leaves remaining upright after some have been moved to prone position will lean forwardly, the rod or bar 28 embracing the foremost one of the remaining upright leaves. After having had one or more of the forward leaves in prone position the attendant will raise their free ends until the rearward one of the leaves engages the inclined guide 19' and raises the arm 19, permitting the leaves to move on back until they stand close together when the arm will drop into place and hold them, but when the modified clasp is employed the attendant will lift the bar 28 to permit the leaves to pass under it. In case the balancing spring which is mounted on the articulated arm is employed it will be understood that the spring may be adjusted to suit requirements, and when under sufficient tension will hold the leaves up to normal position without the use of the clasp, or the clasp may be used also to prevent unauthorized persons from readily operating the leaves. When it is desired to remove the group or set of leaves from the case the fore-arm 39 if used may readily be disconnected from the forward leaf and the clasp may be lifted sufficiently to permit the rear leaf to be lifted from its pivotal support. Then the leaves may be readily placed in the leaf-holder and stored for safe keeping.

Having thus described the invention, what is claimed as new, is—

1. A credit-accounting register including a plurality of bill-holding leaves arranged in upright position, links pivotally connected to the lower forward portions of the leaves and extending forwardly under and connected to the forward portion of adjacent leaves respectively, and movable means for normally drawing the links yieldingly to forwardly extended position.

2. A series of bill holders, a series of links, one for each holder, pivotal connections between the links, and pivotal connections between each link and the adjacent holder permitting the latter to swing relative thereto and relative to adjoining holders.

3. A series of bill holders having their lower ends inclined rearwardly and upwardly, a series of articulated links, one for each holder, for supporting the holders in stepped relationship, and pivotal connections between the front lower end of each holder and the adjacent link permitting the holder to swing relative thereto and relative the next rearward holder.

4. A credit-accounting register including a plurality of leaves hingedly connected together, the rearmost leaf being pivotally supported at its hingedly connected end, and an articulated arm pivotally supported and pivotally connected with the foremost leaf and provided with a spring normally forcing the pivotally connected portion of the arm away from the pivotal support of the rearmost leaf.

5. A credit-accounting register including a plurality of leaves arranged normally in upright position, links pivotally connected together and to the lower portions of adjacent leaves, the links together extending from the rearmost one forwardly to the foremost one of the leaves, the rearmost one of the leaves being pivotally supported, and yielding means for normally holding the links in forwardly extended position.

6. A credit-accounting register including a case, a plurality of upright leaves hingedly connected together, a pivotal connection between the rearmost leaf and the case, an arm member pivotally supported in the case, a fore-arm pivotally mounted on the arm member and pivotally connected with the foremost leaf, and a spring suitably supported and connected with the fore-arm to force the latter forwardly.

7. A credit-accounting register including a plurality of leaves hingedly connected together, the rearmost leaf being uprightly supported and supporting the remaining leaves normally in upright position, an arm member pivotally supported, a fore-arm pivotally mounted on the arm member and pivotally connected with the foremost leaf, a coil-spring, and adjustable means connecting the spring with the arm member and the fore-arm.

8. In a credit-accounting register, the combination with a case having a back, a plurality of leaves normally arranged uprightly opposite the back, hinging connections connecting the lower ends of the leaves together, and means detachably connecting the rearmost leaf to the back, of an articulated arm pivotally supported in the case forward of the plane of the leaves and pivotally connected with the foremost leaf, and a spring suitably supported and connected with the arm for forcing the pivotally connected portion of the arm away from the back of the case.

9. In a credit-accounting register, the combination with a case having a back, and a bill-holding leaf supported by the rear portion of the case, of a plurality of hinge-plates pivotally connected together, the terminal end of one of the terminal hinge-plates being pivotally connected to the lower portion of the supported leaf, downwardly and rearwardly yielding means mounted in the case and connected substantially with the terminal end of the other terminal one of the hinge-plates, for holding the hinge-plates substantially in alinement, and a plurality of bill-holding leaves pivotally connected at their lower ends to the hinge-plates, a leaf to each.

10. In a filing appliance, the combination of a plurality of links, a plurality of hinge pins, each pin connecting two adjacent ones of the links together, a plurality of hinge members connected to the hinge pins respectively, a member to each pin whereby each member is pivotally connected with two adjacent ones of the links, and a plurality of filing leaves fixedly connected to the hinge members respectively.

In testimony whereof, I affix my signature in presence of two witnesses.

ELLIS T. SILVIUS.

Witnesses:
P. A. HAVELICK,
J. H. GARDNER.

Copies of this patent may be obtained for five cents each, by addressing the "Commissioner of Patents. Washington, D. C."